United States Patent
Walton (10) Patent No.: US 8,270,002 B1
(45) Date of Patent: Sep. 18, 2012

(54) PRINTING DIGITAL IMAGES WITH ROTATION

(75) Inventor: Derek T. Walton, Bolton, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 1660 days.

(21) Appl. No.: 11/305,406

(22) Filed: Dec. 15, 2005

Related U.S. Application Data (60) Provisional application No. 60/636,433, filed on Dec. 15, 2004.

(51) Int. Cl.
*G06K 9/36* (2006.01)

(52) U.S. Cl. ........ 358/1.15; 358/1.2; 382/233; 382/232; 382/238

(58) Field of Classification Search ............... 358/1.15, 358/1.2; 382/296, 232, 233, 239, 248, 235, 382/238; 375/240.11, 240.19, 240.01; 347/9
See application file for complete search history.

(56) References Cited

U.S. PATENT DOCUMENTS

| | | | | |
|---|---|---|---|---|
| 5,751,865 A * | 5/1998 | Micco et al. | .................. | 382/296 |
| 5,963,672 A * | 10/1999 | Yajima et al. | .................. | 382/238 |
| 6,157,742 A * | 12/2000 | Haruki | .......................... | 382/233 |
| 6,912,318 B2 * | 6/2005 | Kajiki et al. | .................. | 382/239 |
| 6,941,019 B1 * | 9/2005 | Mitchell et al. | ............... | 382/232 |
| 7,146,053 B1 * | 12/2006 | Rijavec et al. | ................ | 382/233 |
| 2005/0206915 A1 * | 9/2005 | Uejo et al. | .................... | 358/1.2 |
| 2006/0072147 A1 * | 4/2006 | Kanno | ......................... | 358/1.15 |

* cited by examiner

*Primary Examiner* — Hilina S Kassa
*Assistant Examiner* — Ashish K Thomas
(74) *Attorney, Agent, or Firm* — John R. Thompson; Stoel Rives LLP (57) ABSTRACT

A novel system (method and apparatus) for printing compressed digital images with rotation, wherein the image is rotated as an integral part of the decompression process. Furthermore, the system is configured so that selected sections of the image can be printing even as other sections of the image are still being processed. As a result, the new approach reduces system memory requirements, avoids reductions in image quality and minimizes printing delays.

18 Claims, 8 Drawing Sheets

DCT - based encoder simplified diagram

DCT - based decoder simplified diagram

Normal decode, order of image data reconstruction:

But, when printing, typically need 90 degree rotate:

*FIG. 6*

Phase I

Phase II

PRINTING DIGITAL IMAGES WITH ROTATION

REFERENCE TO PENDING PRIOR PATENT APPLICATION

This patent application claims benefit of pending prior U.S. Provisional Patent Application Ser. No. 60/636,433, filed Dec. 15, 2004 by Derek T. Walton for PRINTING DIGITAL PHOTOS WITH ROTATION, which patent application is hereby incorporated herein by reference.

FIELD OF THE INVENTION

This invention relates to methods and apparatus for printing digital images in general, and more particularly to methods and apparatus for printing digital images with rotation.

BACKGROUND OF THE INVENTION

Current printers and Multi-Function Peripherals (MFPs) are becoming increasingly photo capable.

In many cases, a printer or MFP should be capable of generating digital photo prints from various sources. Such sources of digital images may comprise, among others, (i) a host personal computer (PC); (ii) memory cards (e.g., SmartMedia, CompactFlash, etc.) which are removed from a digital camera and plugged into appropriate slots on the printer (or MFP); and/or (iii) the digital camera itself, using a technology which permits the images to be printed directly from the digital camera to the printer (or MFP), without having to connect the camera to a computer or remove a memory card from the camera (e.g., using the PictBridge™ technology standard).

In the latter two situations, it is generally required that the printer (or MFP) be capable of printing the images (typically photographs) without assistance from a host PC (e.g., such as where there is no host PC connected to the printer or MFP, or where a host PC is connected to the printer or MFP but the host PC is not powered up). In the printing industry, this capability is sometimes referred to as "standalone photo printing capability".

While such standalone photo printing capability eliminates the need for an operational PC at the time of printing, it also poses several significant challenges for the manufacturer of the printer (or MFP). One of the more significant challenges of standalone photo printing relates to the printing of digital photos (i.e., images) with rotation.

More particularly, consider a typical setting in which the digital camera creates an image with a landscape orientation, but the printer (or MFP) is equipped with a paper feed mechanism which advances the paper with a portrait orientation. In this situation, in order for the printer (or MFP) to print the landscape image on a standard 4"×6" sheet, 5"×7" sheet, letter-sized (i.e., 8.5"×11") sheet, etc., the image must be rotated 90 degrees in order to convert the image orientation from its camera orientation (i.e., landscape) to its printer orientation (i.e., portrait). However, such rotation is complicated by the fact that most cameras use a JPEG data compression algorithm when storing their image files, and the JPG compression algorithm has both "sequence" and "incremental state" aspects to it, such that it is quite difficult to rotate the image while the image is in its compressed (i.e., JPEG) format.

Figure 1:
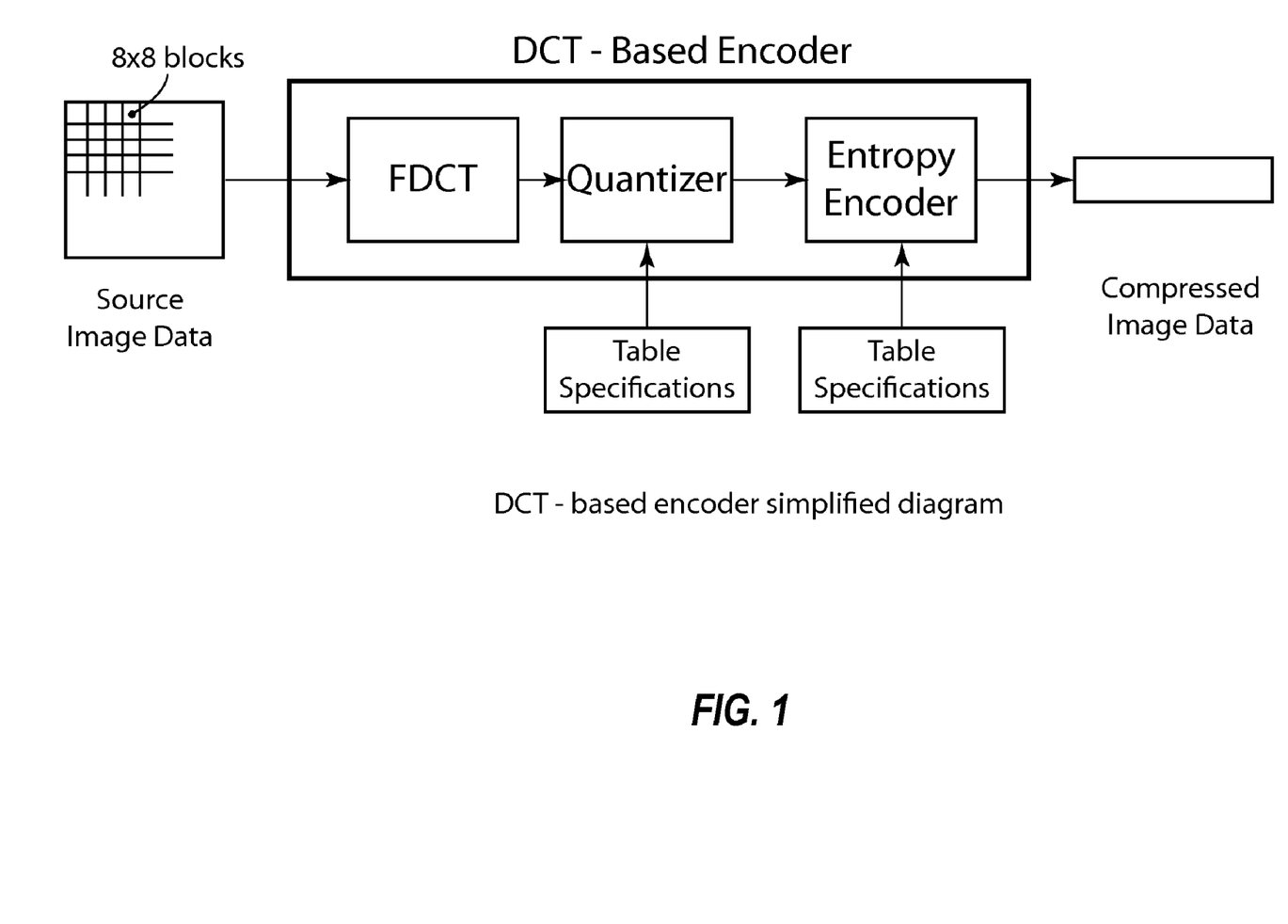
FIG. 1 is a schematic diagram illustrating the JPEG compression algorithm.
Figure 2:
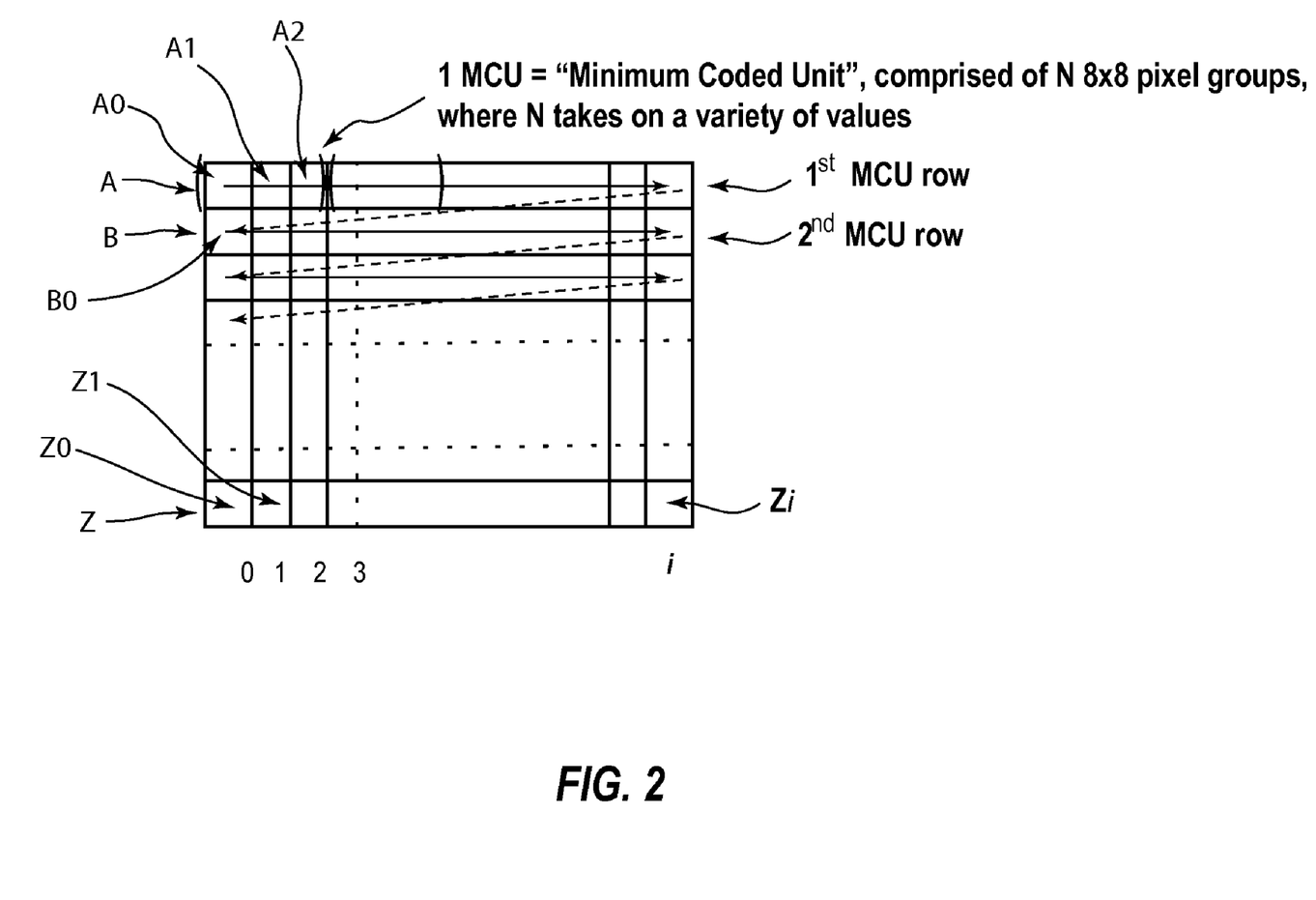
FIG. 2 is a schematic diagram illustrating successive left-to-right, top-to-bottom encoding of the JPEG's MCU data blocks.
Figure 3:
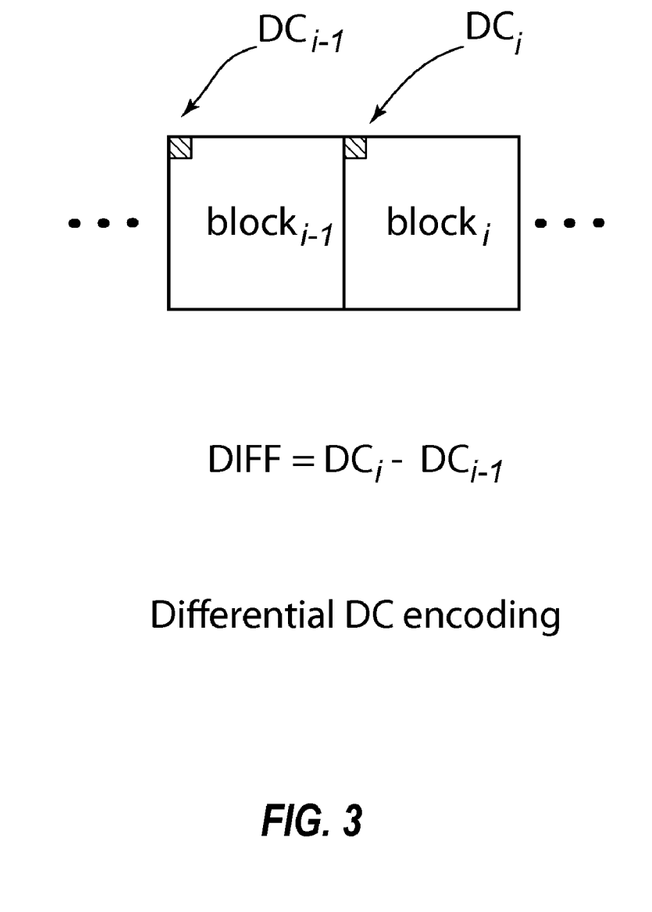
FIG. 3 is a schematic diagram illustrating the "incremental state" encoding of successive data blocks in the JPEG encoding algorithm.

More particularly, with the JPEG compression algorithm (see FIG. 1), successive segments of the image are encoded in Minimum Coded Units (MCUs), starting at the top left-hand corner of the image and proceeding left-to-right, top-to-bottom (see FIG. 2). Thus, the MCUs in a compressed JPEG file can be considered to have a "sequence". In addition, the JPEG encoding algorithm uses the state of the immediately-preceding MCU when encoding the current MCU (see FIG. 3). Thus, there is an "incremental state" associated with the encoding of each successive MCU.

Figure 4:
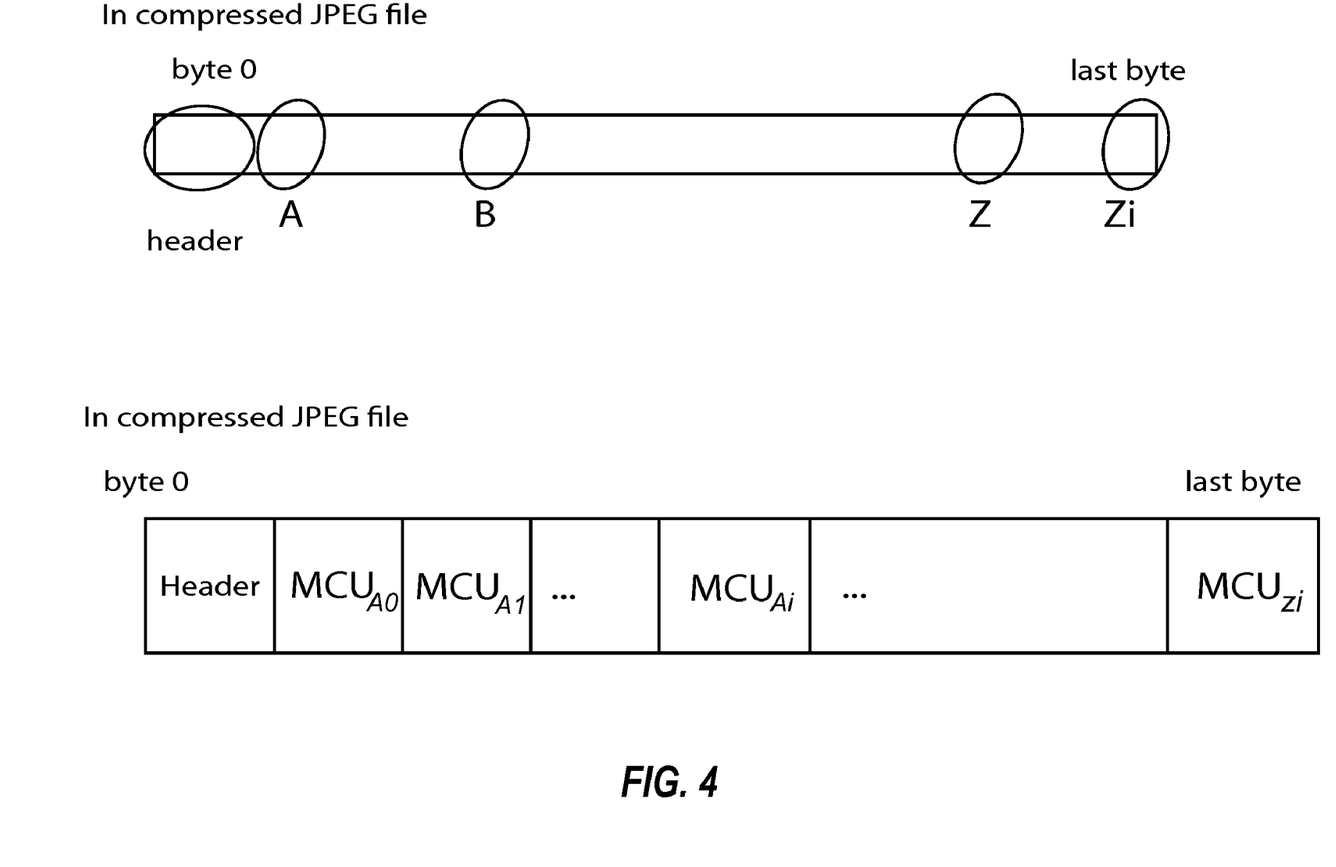
FIG. 4 is a schematic diagram illustrating the basic format of a compressed JPEG file, showing the file header and successive MCU data blocks.

The JPEG compression process results in the creation of a data file which comprises a header and successive MCU data blocks (see FIG. 4).

Figure 5:
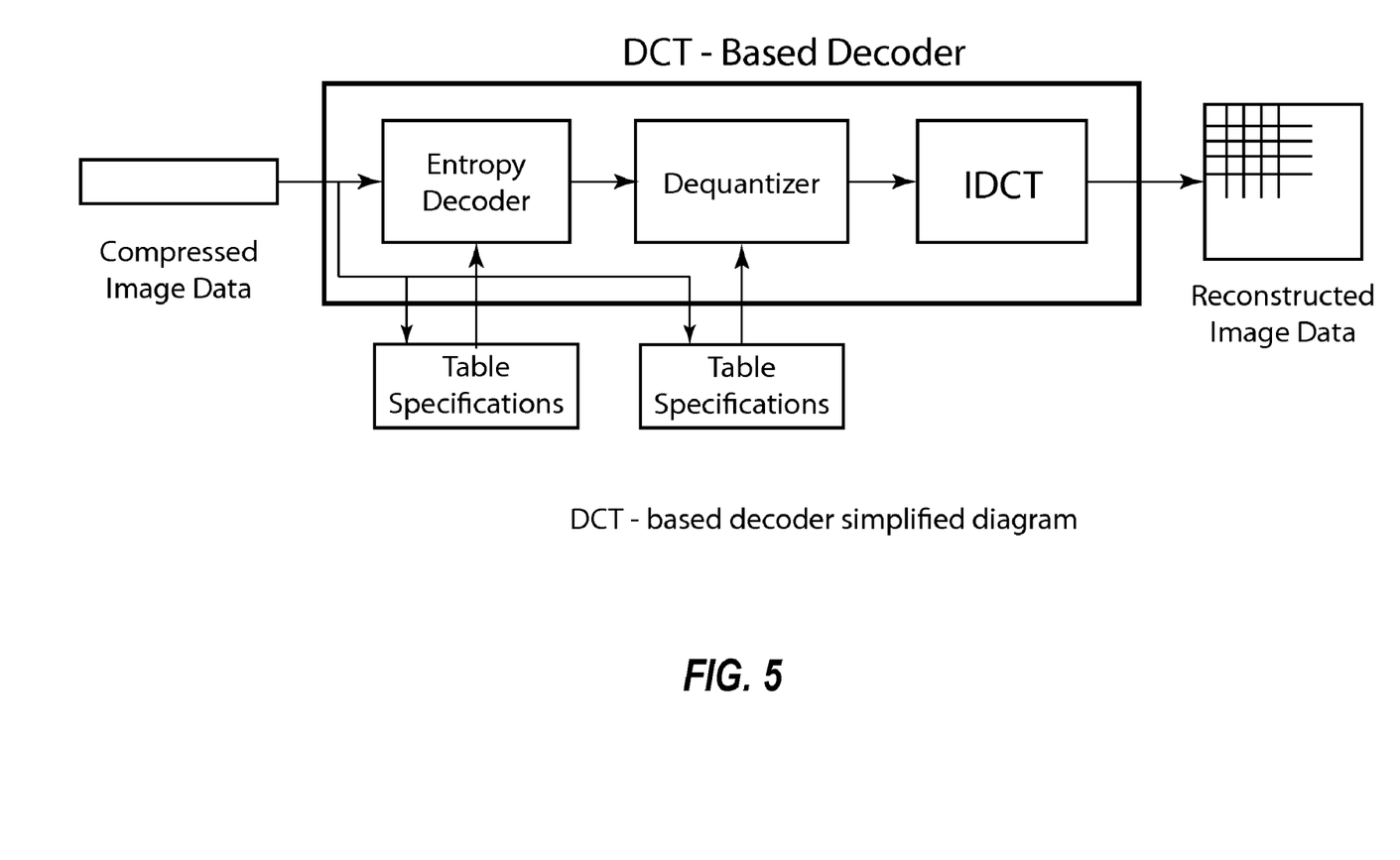
FIG. 5 is a schematic diagram illustrating the JPEG decompression algorithm.

During decompression (see FIG. 5), the foregoing process is essentially reversed, i.e., the MCU in the top left-hand corner is decompressed first, and then each successive MCU is decompressed in order, using the state of the immediately-preceding MCU to effect decompression for the current MCU.

Figure 6:
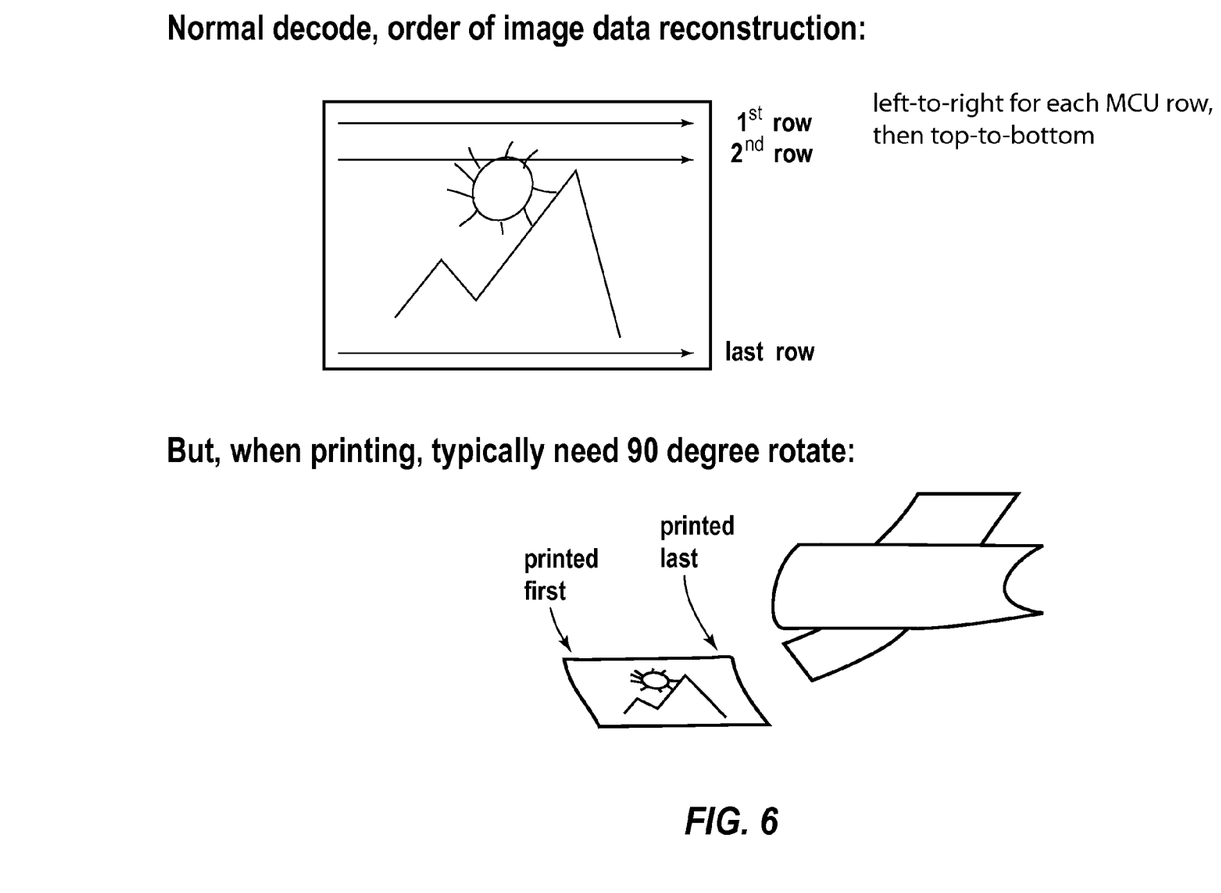
FIG. 6 is a schematic illustration showing the sort of rotation typically required to convert from the landscape orientation of the camera's JPEG data file to the portrait orientation of the printer's paper feed mechanism.

Thus, when an image needs to be rotated for printing (i.e., converted from the landscape orientation of the camera's JPEG data file to the portrait orientation of the printer's paper feed mechanism, see FIG. 6), it is not possible to simply decompress the MCUs in a sequence matching the orientation of the paper in the printer tray. In other words, it is not possible to simply decompress the MCUs in a sequence matching the order of the printing process, i.e., $MCU_{A0}$, $MCU_{B0}$, $MCU_{C0}$, $MCU_{D0}$, ..., $MCU_{Z0}$, $MCU_{A1}$, $MCU_{B1}$, $MCU_{C1}$, $MCU_{D1}$, ..., $MCU_{Z1}$. $MCU_{A2}$, $MCU_{B2}$, $MCU_{C2}$, $MCU_{D2}$, ..., since this does not yield proper MCU decompression. Proper MCU decompression requires a left-to-right, top-to-bottom sequence, starting at the top left-hand corner of the image. Thus, proper MCU decompression requires the different sequence $MCU_{A0}$, $MCU_{A1}$, $MCU_{A2}$, $MCU_{A3}$, ..., $MCU_{Ai}$, $MCU_{B0}$, $MCU_{B1}$, $MCU_{B2}$, $MCU_{B3}$, ..., $MCU_{Bi}$, $MCU_{C0}$, $MCU_{C1}$, $MCU_{C2}$, $MCU_{C3}$, ....

As a result, when a digital image must be rotated for printing, it is generally first decompressed in its entirety, stored into a temporary buffer on the printer (and/or MFP), and then read out of the temporary buffer in the sequence required by the print process. Alternatively, the decompressed image can be rotated before it is stored into the temporary buffer, so that it is already in the sequence required by the printer. In either case, this approach is relatively straightforward; however, it suffers from two significant disadvantages.

First, this procedure requires that the temporary buffer be quite large, since it has to hold the entire decompressed image. However, as image resolutions increase, this can become prohibitively expensive. By way of example, an image from an 8 megapixel camera, which might occupy 3.5 megabytes in its compressed JPEG form, could require as much as 24 megabytes of memory in its decompressed form. Thus, the printer (or MFP) must provide significant amounts of additional memory for the temporary buffer, which increases the cost of the printer (or MFP). This is generally undesirable, given the thin profit margins of the printer (and MFP) markets. It is, of course, possible to avoid adding such additional memory by downscaling the image to the extent required to fit within the existing memory constraints, however, this downscaling process discards detail information, and thereby reduces image quality, which is generally undesirable.

The "simple" rotation scheme described above (i.e., full decompression, storage, rotation and printing; or full decompression, rotation, storage and printing) has another significant disadvantage associated with it. More particularly, with this approach, the image must be fully decompressed before printing can begin. Depending on the speed of the decompression engine, this may cause a significant delay between the time that the user issues the print command to the time the printer (or MFP) begins laying down ink on the paper.

Therefore, there is a need for a new and improved system (method and apparatus) for printing digital images with rotation which reduces system memory requirements, avoids reductions in image quality and minimizes printing delays.

SUMMARY OF THE INVENTION

These and other objects of the present invention are addressed by the provision and use of a novel system (method and apparatus) for printing digital images with rotation, wherein the image is rotated as an integral part of the decompression process. Furthermore, the system is configured so that selected sections of the image can be printing even as other sections of the image are still being processed. As a result, the new approach reduces system memory requirements, avoids reductions in image quality and minimizes printing delays.

In one form of the present invention, there is provided a method for printing an image from a compressed file with rotation, wherein the compression algorithm has both sequence and incremental state aspects to it, comprising:

rotating the image as an integral part of the decompression process.

In another form of the present invention, there is provided a method for printing an image from a compressed file with rotation, wherein the compression algorithm has both sequence and incremental state aspects to it, comprising:

identifying in the compressed file the specific data blocks needed for a given step in the printing process of the rotated image;

decompressing the identified data blocks needed for that given step in the printing process;

printing the decompressed data blocks; and repeating the foregoing until the desired portion of the image has been rotated and printed.

In another form of the present invention, there is provided a method for printing an image from a compressed file with rotation, wherein the compression algorithm has both sequence and incremental state aspects to it, comprising:

pre-scanning the compressed file to determine information required in order to decompress a given data block of the compressed file; and decompressing in proper sequence the specific data blocks of the compressed file needed for printing a particular portion of the image in rotated form.

In another form of the present invention, there is provided an apparatus for printing an image from a compressed file with rotation, wherein the compression algorithm has both sequence and incremental state aspects to it, comprising:

a component for rotating the image as an integral part of the decompression process.

In another form of the present invention, there is provided an apparatus for printing an image from a compressed file with rotation, wherein the compression algorithm has both sequence and incremental state aspects to it, comprising:

a component for identifying in the compressed file the specific data blocks needed for a given step in the printing process of the rotated image;

a component for decompressing the identified data blocks needed for that given step in the printing process;

a component for printing the decompressed data blocks; and a component for repeating the foregoing until the desired portion of the image has been rotated and printed.

In another form of the present invention, there is provided an apparatus for printing an image from a compressed file with rotation, wherein the compression algorithm has both sequence and incremental state aspects to it, comprising:

a component for pre-scanning the compressed file to determine information required in order to decompress a given data block of the compressed file; and a component for decompressing in proper sequence the specific data blocks of the compressed file needed for printing a particular portion of the image in rotated form.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PRESENT INVENTION

The present invention provides a system for printing digital images with rotation, wherein the image is rotated as an integral part of the JPEG decompression process. More particularly, the present invention provides a novel system wherein portions of the image remain in the memory of the source device (e.g., the camera) or the printer (or MFP) in the compressed format while other portions of the image are decompressed into a buffer memory of the printer (or MFP) and printed. Thus, the memory requirements of the printer (or MFP) are reduced, image quality is maintained and printing delays minimized.

More particularly, in one form of the present invention, the image which is to be printed is first pre-scanned so as to populate a set of context data structures relating to the JPEG's MCU data blocks. This set of context data structures then provides adequate information so as to enable decoding of the MCU data blocks in a sequence which can be different from that in which they were encoded. As a result, sections of the image can be decompressed and sent to the printer in the sequence required by the printer, rather than in the sequence in which the image was compressed. Thus, and as will hereinafter be discussed in further detail, the system of the present invention preferably comprises two phases: a pre-scanning phase in which the context data structures are created, and a decoding phase in which selected MCUs are decoded for printing.

In one preferred form of the present invention, the system is configured to work with digital photos compressed with the JPEG compression algorithm. For convenience of description, the following disclosure will be discussed in the context of rotating and printing an image stored in the JPEG compression format. However, it should be appreciated that the system of the present invention has application to images stored in formats other than the JPEG format, and the disclosure should not be read as limiting application of the present invention to the JPEG compression algorithm.

Phase I—Pre-Scanning

Figure 7:
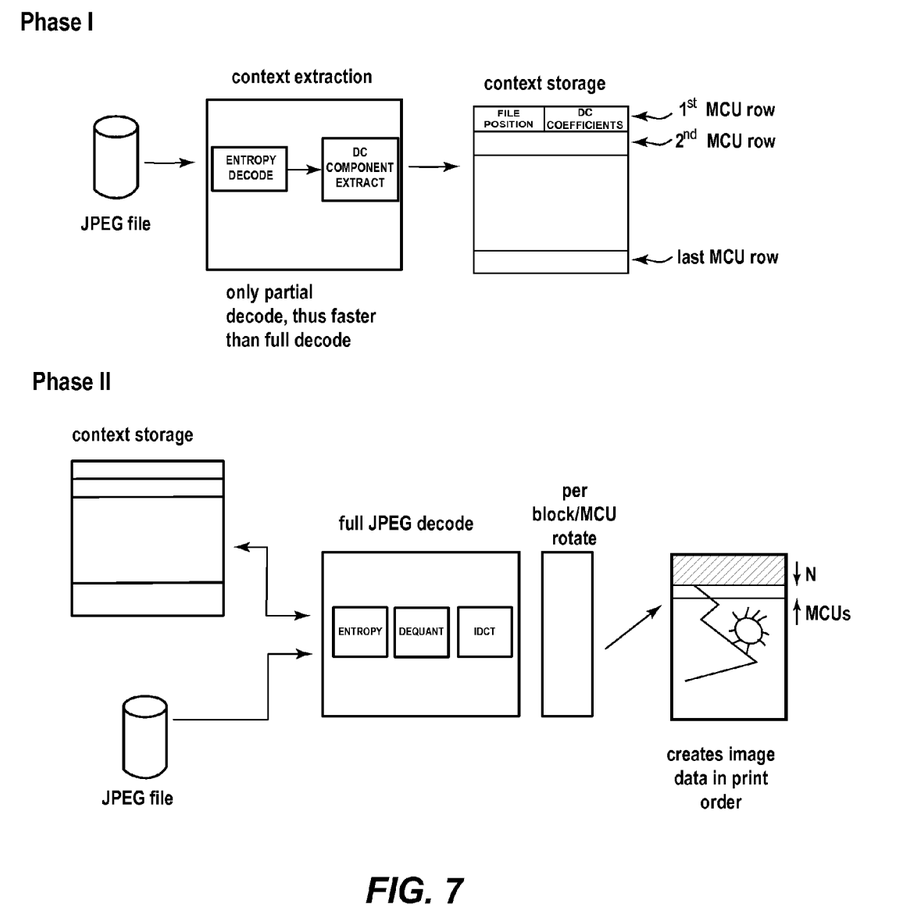
FIG. 7 is a . . . schematic diagram illustrating the two-phase (pre-scanning and decoding) process used in one preferred implementation of the present invention.

Looking now at FIG. 7, in the pre-scanning phase ("Phase I"), the encoded JPEG image is pre-scanned in order to populate a set of context data structures. These context data structures contain all of the information required in order to decompress a given MCU. In particular, the context data structures contain, for each MCU, (i) the location of the MCU within the compressed JPEG file, and (ii) the "incremental state" information required to decompress that MCU (i.e., the "DC coefficients" of the immediately-preceding MCU which are used to encode the current MCU).

In accordance with one preferred form of the present invention, the pre-scanning is effected on a row-by-row basis. More particularly, during the Phase I pre-scanning process, a separate instance of the context data structure is used for each row of MCUs within the image. Later, during the Phase II decoding process (see below), each collected context data structure provides, to the decompression engine, all the information required in order to decompress the next MCU within that MCU row. In the Phase I pre-scanning process, each context data structure is initialized to set up for the decompression of the first MCU (i.e., the left-most MCU) within each MCU row of the JPEG file.

It should be appreciated that, in accordance with the present invention, for the JPEG compression algorithm, it is not necessary to fully decode the digital image in order to initialize the context data structures. In fact, only a small part of the decompression needs to be performed during the Phase I pre-scanning in order to derive the context data structures (e.g., iZIGZAG, iQUANT, iDCT, etc. are not required). Thus, the pre-scanning process of Phase I is not equivalent to full MCU decompression; rather, only selected information (i.e., file location and DC coefficients) is extracted and stored. As a result, the pre-scanning process of Phase I is significantly faster than full image decompression.

Phase II—Decoding

Still looking now at FIG. 7, in the decoding phase ("Phase II"), the JPEG image is decompressed. However, decompression proceeds, starting in the upper left-hand corner, top-to-bottom, left-to-right. This decompression scheme is quite different from the standard JPEG decompression which proceeds, starting in the upper left-hand-corner, left-to-right, top-to-bottom. In other words, with the new decompression scheme, the image is decompressed on a column-by-column basis, left-to-right, in a manner corresponding to the order of the print process. By contrast, with the standard JPEG decompression scheme, the image is decompressed on a row-by-row basis, in a manner corresponding to the compression sequence. Significantly, the novel decompression scheme of the present invention is enabled by the Phase I pre-scanning process, which permits the MCUs of the JPEG image to be decompressed in any order desired.

Thus, with the present invention, the MCUs of the landscape-oriented JPEG image are decompressed on a column-by-column basis, stored in a ring buffer, and then printed on the portrait-oriented paper on a row-by-row basis, whereby to achieve the desired image rotation.

Significantly, since the process of decoding the compressed JPEG image proceeds on a column-by-column basis, matching the requirements of the printer, the bulk of the image can be maintained in its original compressed JPEG format in the image source (i.e., the digital camera) or the printer (or MFP) memory rather than in a decompressed form in the printer (or MFP) memory, whereby to minimize printer memory requirements. And to the extent that the printer (or MFP) uses a ring buffer to store decompressed image data prior to printing, the size of the temporary image ring buffers can be relatively small. Furthermore, it should also be noted that the time to perform the decompression may be overlapped with the time that the print mechanism takes to print the image. Thus, the decompression engine only has to be as fast as the printer (or MFP), thereby further reducing system requirements.

If desired, each column of MCUs can be decoded and sent to the printer before the next column of MCUs is decoded. Alternatively, several consecutive columns of MCUs can be decoded as a group and sent to the printer before moving on to an adjacent section of the image. Or, if desired, enlarged columns may be created by decoding several consecutive MCU units in each row, thereby generating an enlarged column structure to be sent to the printer.

In one preferred implementation, in order to reduce the memory requirements of the printer (or MFP), it is not necessary to simultaneously store the context data structures for all of the MCUs in the JPEG image. Rather, it is possible to store the context data structures for the left-hand-most MCU column in the compressed JPEG image, use those data structures when decoding that left-hand-most column of MCUs and then, when proceeding to the next MCU column, generating the necessary context data structures using the context data structures from the MCU column just processed. This procedure can then be repeated across the JPEG image. As a result, the context data structures need only be stored for one MCU column at any given time. In essence, with this approach, updated context data is written back to memory as each column of the JPEG image is processed, ready to be used to decode the next column of MCUs in the JPEG image. Thus, a minimum of memory is used to store the context data structures needed to decompress the JPEG image in the sequence called for the by the printer.

Adaptation for Ultra-Low Memory Footprints

The memory device which holds the compressed JPEG image during decompressing and printing may be internal or external to the printer (or MFP). Where the memory of the printer (or MFP) is adequate, it is generally preferable for the compressed JPEG image to be transferred from the image source (e.g., camera card, the digital camera itself, etc.) to the internal memory of the printer (or MFP) prior to processing and printing. This is because the printer (or MFP) memory generally permits faster access of the data.

In one preferred embodiment of the present invention, this transfer may be performed as part of the Phase I pre-scanning process. While this approach speeds up data access, it has the disadvantage of increasing memory requirements of the printer (or MFP). In fact, the internal memory of the printer (or MFP) must be sized appropriately to accommodate the size of the largest compressed digital image which is to be supported by that printer (or MFP). This solution is generally not desirable, particularly in view of the ongoing trend of providing images of ever higher resolution and, accordingly, of ever larger file sizes.

An alternative approach is to access the image on the image source (i.e., camera card, digital camera, etc.). This alternative approach has the advantage that it yields the lowest possible memory footprint within the printer (or MFP). However, this approach may present difficulties when the image is to be printed at high speed, because the transfer of data (from image source to printer) may not be fast enough to keep up with the printing process. In other words, image accesses to a remote device, especially to a digital camera and, to a lesser extent, to locally connected camera cards, may introduce undesirable delays from when the request to read data is made to when the data is actually delivered.

This data delivery delay may also become problematic with the novel approach of the present invention, due to the memory access patterns required by the Phase II decoding technique. The Phase II technique of decoding N MCUs from one row, then N MCUs from the next row, etc. yields a memory access pattern in which small amounts of data are frequently accessed from random locations within the file. A remote digital camera and, to a lesser extent, a locally connected camera card, may be relatively efficient when streaming consecutive data retrieved from a file, but is generally much less efficient when streaming small blocks of data retrieved from random locations within the file.

In order to allow for a more efficient processing of images that are stored on the remote device, the present invention provides a technique which expands the context data structure for each MCU row to include a ring buffer for the data to be decompressed for that MCU row. More particularly, during the Phase I pre-scanning process, the ring buffers for each of the MCU rows are pre-filled with compressed image data, starting with the compressed data for the left-most MCU to be decompressed and continuing to include compressed data for as many MCUs on the row as the size of the ring buffer permits. As discussed above, during the Phase I pre-scanning process, the entire image file is pre-scanned so as to initialize the data context structures for each MCU row. During this time the context ring buffers may be pre-filled with compressed image data, without the need for additional accesses to the image data. Then, during the Phase II decoding process, memory accesses to the image file are performed concurrently with the decoding process so as to keep the ring buffers full on a continuous basis. In this way, the latency of the memory accesses to the digital camera or memory card do not slow down the printing. In addition, the ring buffers may offer further efficiency by increasing the average amount of data that is transferred during each memory access.

Figure 8:
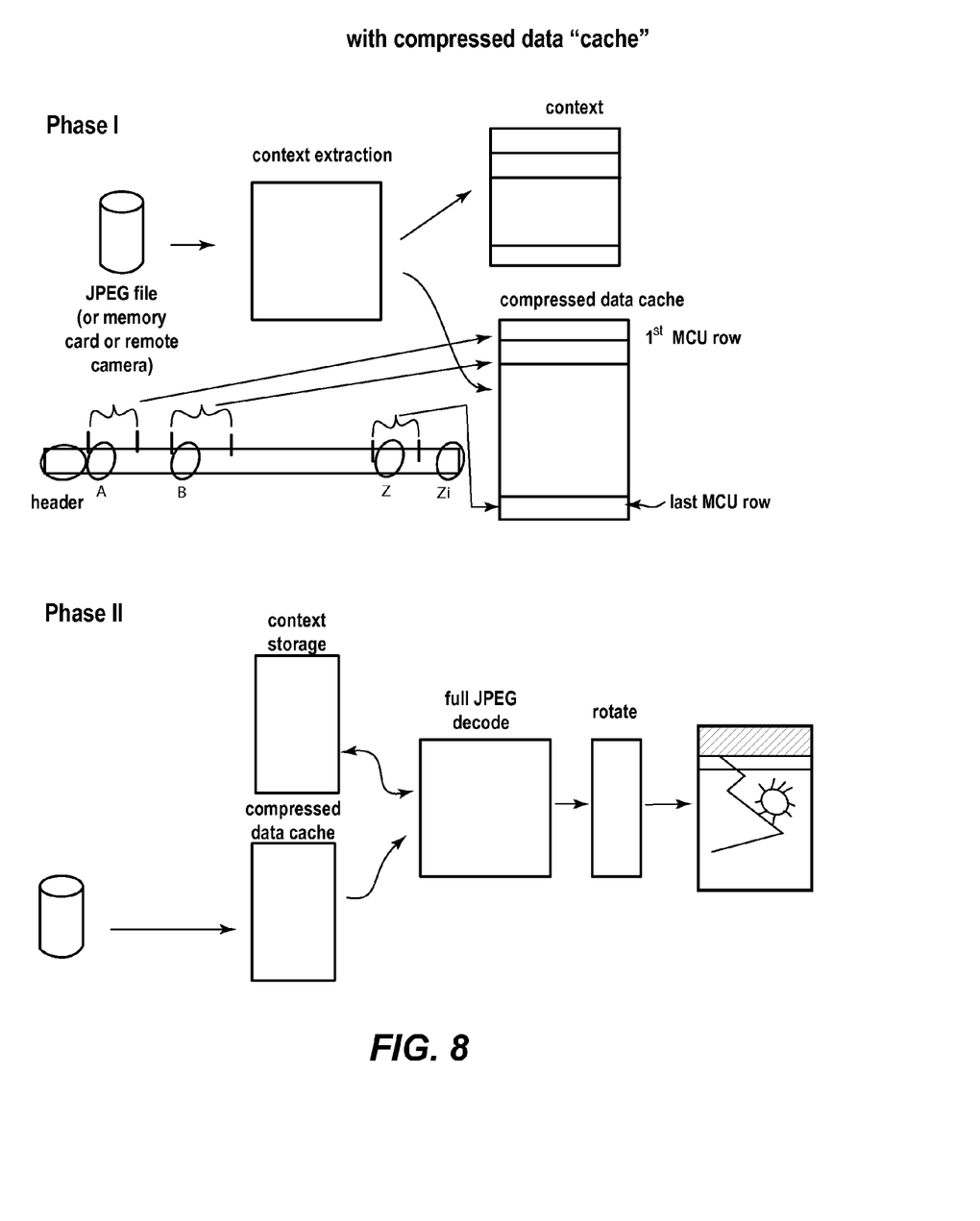
FIG. 8 is a schematic diagram illustrating another implementation of the present invention.

In order to optimally use the ring buffers, a hybrid strategy, using both of the above memory storage solutions, may be used. More particularly, and looking now at FIG. 8, if the printer (or MFP) contains a fixed amount of memory which is available for use to store the compressed image during image printing, and the compressed image (or images) to be printed are found to be small enough to fit within this available memory, then the image (or images) is transferred to this local memory as part of the pre-scanning process, and then the images are accessed locally during Phase II decoding. If, on the other hand, the compressed images are found to be too large to fit in the available local memory of the printer (or MFP), the images residing on the digital camera or camera card are accessed remotely on that device, and the available memory is divided among the per row MCU ring buffers for these images.

Further Modifications

In the illustrated preferred implementations of the present invention, the order of the printing process was shown to require that decompression progress from left-most to right-most edge of the original image. One skilled in the art should recognize that the techniques of this invention can be similarly applied when the printing process instead requires that decompression progress from right-most to left-most edge of the original image, or from bottom-most to top-most edge of the image. For these cases, different MCU decompression sequences are required, for which different optimal sets of context data structures can be constructed and different organizations of compressed data ring buffers can be used.

It should also be appreciated that the techniques of this invention can be applied when only a portion of the original compressed image is to be printed (i.e., when the original image is to be cropped prior to printing).

Furthermore, it should be appreciated that the innovations described herein can be used, in various combinations on a per image bases, to achieve printing which reproduces multiple images from multiple different compressed image files onto a single output page.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method for printing an image from a compressed file with rotation, comprising:

accessing a compressed image file on a digital memory, the compressed image file having a plurality of data blocks that are compressed according to a compression sequence using incremental state information, wherein successive data blocks of the plurality of data blocks are compressed using incremental state information from an immediately preceding data block in the compression sequence;

selecting a data block according to a printing sequence defining an order in which to print the plurality of data blocks for a desired image rotation, wherein the printing sequence is different from the compression sequence;

obtaining, for the selected data block, corresponding incremental state information from the immediately preceding prior data block in the compression sequence stored in the compressed image file;

decompressing the selected data block using the obtained incremental state information;

printing the decompressed data block; and repeating the foregoing selecting, decompressing, and printing until the image has been printed with the desired rotation, wherein the printing sequence begins with a data block in the upper left hand corner of the compressed image and proceeds on a column basis, left to right.

2. A method for printing an image from a compressed file with rotation, comprising:

accessing a compressed image file on a digital memory, the compressed image file having a plurality of data blocks that are compressed according to a compression sequence using incremental state information, wherein successive data blocks along each row of the compressed image file are compressed using incremental state information from an immediately preceding data block in the compression sequence;

pre-scanning the plurality of data blocks of the compressed image file to determine, for a first column of data blocks, corresponding incremental state information comprising DC coefficients needed to decompress the first column of data blocks;

decompressing the first column of data blocks of the compressed image file according to a printing sequence defining an order in which to print the plurality of data blocks for a desired image rotation, wherein decompressing the first column of data blocks is accomplished using the incremental state information determined from pre-scanning, and wherein the printing sequence is different from the compression sequence;

generating, based on the decompressed first column of data blocks, updated incremental state information comprising DC coefficients needed to decompress a second column of data blocks in the compressed image file; and decompressing the second column of data blocks of the compressed image file using the updated incremental state information, wherein the printing sequence begins with a data block in the upper left hand corner of the compressed image and proceeds on a column basis, left to right.

3. The method according to claim 2, wherein the image compression algorithm comprises the JPEG compression algorithm.

4. The method according to claim 2, wherein each data block comprises a Minimum Coded Unit (MCU).

5. The method according to claim 2, wherein the updated incremental state information of a given data block in the second column comprises the DC coefficients of a data block in the first column that was encoded immediately prior to the given data block.

6. Apparatus for printing an image from a compressed file with rotation, comprising:
  a component for accessing a compressed image file on a digital memory, the compressed image file having a plurality of data blocks that are compressed according to a compression sequence using incremental state information, wherein successive data blocks of the plurality of data blocks are compressed using incremental state information from an immediately preceding data block in the compression sequence;
  a component for selecting a data block according to a printing sequence defining an order in which to print the plurality of data blocks to print the image with a desired rotation, wherein the printing sequence is different from the compression sequence;
  a component for obtaining, for the selected data block, corresponding incremental state information from one or more prior data blocks that are prior to the selected data block in the compression sequence stored in the compressed image file;
  a component for decompressing the selected data block using the obtained incremental state information used to compress the selected data block;
  a component for printing the decompressed data block; and
  a component for repeating the foregoing selecting, decompressing, and printing until the image has been printed with the desired rotation,
  wherein the printing sequence begins with a data block in the upper left hand corner of the compressed image and proceeds on a column basis, left to right.

7. Apparatus for printing an image from a compressed file with rotation, comprising:
  a component for accessing a compressed image file on a digital memory, the compressed image file having a plurality of data blocks that are compressed according to a compression sequence using incremental state information, wherein successive data blocks along each row of the compressed image file are compressed using incremental state information from an immediately preceeding data block in the compression sequence;
  a component for pre-scanning the plurality of data blocks of the compressed image file to determine, for a first column data blocks, corresponding incremental state information comprising DC coefficients needed to decompress the first column of data blocks;
  a component for decompressing the first column of data blocks of the compressed image file according to a printing sequence defining an order in which to print the plurality of data blocks for a desired image rotation, wherein decompressing the first column of data blocks is accomplished using the incremental state information determined from pre-scanning, and wherein the printing sequence is different from the compression sequence;
  a component for generating, based on the decompressed first column of data blocks, updated incremental state information comprising DC coefficients needed to decompress a second column of data blocks in the compressed image file; and
  a component for decompressing the second column of data blocks of the compressed image file using the updated incremental state information,
  wherein the printing sequence begins with a data block in the upper left hand corner of the compressed image and proceeds on a column basis, left to right.

8. An apparatus according to claim 7, wherein the image compression algorithm comprises the JPEG compression algorithm.

9. An apparatus according to claim 7, wherein the data block comprises a Minimum Coded Unit (MCU).

10. An apparatus according to claim 7, wherein the-updated incremental state information of a given data block in the second column comprises the DC coefficients of a data block in the first column that was encoded immediately prior to the given data block.

11. A method for printing an image from a compressed file with rotation, comprising:
  accessing a compressed image file stored on a remote memory device, the compressed image file having a plurality of data blocks that are compressed according to a compression sequence using incremental state information, wherein successive data blocks along each row of the compressed image file are compressed using incremental state information from an immediately preceding data block in the compression sequence;
  comparing a size of the compressed image file with an amount of available local memory within a printer;
  determining, based on the comparison, how many of the compressed data blocks from each row to transfer from the remote memory device to the local memory within the printer during a pre-scanning process;
  performing the pre-scanning process on the plurality of data blocks to extract the incremental state information from the compressed image file, wherein performing the pre-scanning process comprises storing the determined number of compressed data blocks from each row of the compressed image file in the local memory within the printer; and decompressing the data blocks stored in the local memory within the printer according to a printing sequence defining an order in which to print the plurality of data blocks for a desired image rotation, wherein decompressing the data blocks is accomplished using the incremental state information extracted during pre-scanning, wherein the printing sequence is different from the compression sequence, and wherein the printing sequence begins with a data block in the upper left hand corner of the compressed image and proceeds on a column basis, left to right.

12. The method of claim 11, wherein performing the pre-scanning process further comprises:

reading consecutive data blocks from each row of the compressed image file stored on the remote memory device;

storing the determined number of consecutively read data blocks in the local memory within the printer; and performing a partial decompression of the consecutively read data blocks to extract the corresponding incremental state information.

13. The method of claim 11, wherein the comparison results in determining that the amount of available local memory within the printer is sufficient to store the entire compressed image file, and wherein performing the pre-scanning process further comprises storing each of plurality of data blocks from the compressed image file in the local memory within the printer.

14. The method of claim 11, wherein the determined number of compressed data blocks comprises less than a total number of compressed data blocks from each row of the compressed image file, wherein performing the pre-scanning process comprises storing a first subset of compressed data blocks from each row in the local memory in the printer; and wherein the method further comprises:

as columns of data blocks stored in the local memory within the printer are decompressed according to the printing sequence, reading a second subset of compressed data blocks from each row in the compressed image file stored in the remote memory; and storing the second subset of compressed data blocks in the local memory within the printer at locations corresponding to columns of previously decompressed data blocks.

15. An apparatus for printing an image from a compressed file with rotation, comprising:

a component for accessing a compressed image file stored on a remote memory device, the compressed image file having a plurality of data blocks that are compressed according to a compression sequence using incremental state information, wherein successive data blocks along each row of the compressed image file are compressed using incremental state information from an immediately preceding data block in the compression sequence;

a local memory;

a component for comparing a size of the compressed image file with an amount of available space within the local memory;

a component for determining, based on the comparison, how many of the compressed data blocks from each row to transfer from the remote memory device to the local memory during a pre-scanning process;

a component for performing the pre-scanning process on the plurality of data blocks to extract the incremental state information from the compressed image file, wherein performing the pre-scanning process comprises storing the determined number of compressed data blocks from each row of the compressed image file in the local memory; and a component for decompressing the data blocks stored in the local memory according to a printing sequence defining an order in which to print the plurality of data blocks for a desired image rotation, wherein decompressing the data blocks is accomplished using the incremental state information extracted during pre-scanning, wherein the printing sequence is different from the compression sequence, and wherein the printing sequence begins with a data block in the upper left hand corner of the compressed image and proceeds on a column basis, left to right.

16. The apparatus of claim 15, wherein the component for performing the pre-scanning process is configured to:

read consecutive data blocks from each row of the compressed image file stored on the remote memory device;

store the determined number of consecutively read data blocks in the local memory; and perform a partial decompression of the consecutively read data blocks to extract the corresponding incremental state information.

17. The apparatus of claim 15, wherein the component for determining determines that the amount of available local memory is sufficient to store the entire compressed image file, and wherein the component for performing the pre-scanning process is further configured to store, based on the determination, each of plurality of data blocks from the compressed image file in the local memory.

18. The apparatus of claim 15, wherein the component for determining determines that the number of compressed data blocks comprises less than a total number of compressed data blocks from each row of the compressed image file, wherein the component for performing the pre-scanning process is configured to, based on the determination, store a first subset of compressed data blocks from each row in the local memory, and wherein the apparatus further comprises a component for:

as columns of data blocks stored in the local memory are decompressed according to the printing sequence, read a second subset of compressed data blocks from each row in the compressed image file stored in the remote memory; and store the second subset of compressed data blocks in the local memory at locations corresponding to columns of previously decompressed data blocks.

* * * * *